United States Patent Office 3,069,467
Patented Dec. 18, 1962

3,069,467
HYDROLYSIS OF 2-DECARBOXAMIDO-2-CYANO-6-DEOXY-TETRACYCLINE DERIVATIVES
John J. Beereboom and Kenneth Butler, Waterford, Conn., assignors to Chas. Pfizer & Co., Inc., New York, N.Y., a corporation of Delaware
No Drawing. Filed Aug. 28, 1961, Ser. No. 134,119
5 Claims. (Cl. 260—559)

This application is concerned with the hydrolysis of nitriles, and more particularly with the preparation of acid-stable tetracyclines from their 2-decarboxamido-2-nitriles.

The tetracycline antibiotics comprise a group of biologically active hydronaphthacene derivatives having the following essential structural features. The numbering system indicated is that employed by "Chemical Abstracts."

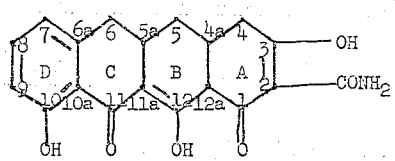

Among the biologically active members of this group are those containing the following substituent groups:

| Substituents: | Common name |
|---|---|
| 4—N($CH_3$)$_2$,6—OH,6—$CH_3$,12a—OH | tetracycline. |
| 4—N($CH_3$)$_2$,5—OH,6—OH,6—$CH_3$,12a—OH | 5-oxytetracycline. |
| 4—N($CH_3$)$_2$,6—OH,6—$CH_3$,7—Cl,12a—OH | 7-chlorotetracycline. |
| 4—N($CH_3$)$_2$,5—OH,6—$CH_3$,12a—OH | 6-deoxy-5-oxytetracycline. |
| 5—OH,6—$CH_3$,12a—OH,6—OH | 4-desdimethylamino-5-oxytetracycline. |
| 4—N($CH_3$)$_2$,6—$CH_3$,12a—OH | 6-deoxytetracycline. |
| 4—N($CH_3$)$_2$,12a—OH | 6-deoxy-6-demethyltetracycline. |
| 4—N($CH_3$)$_2$,6—OH,6—$CH_3$,7—Br,12a—OH | 7-bromotetracycline. |
| 4—N($CH_3$)$_2$,6—OH,7—Cl,12a—OH | 6-demethyl-7-chlorotetracycline. |
| 6—OH,6—$CH_3$,12a—OH | 4-desdimethylaminotetracycline. |
| 6—OH,6—$CH_3$,7—Cl,12a—OH | 4-desdimethylamino-7-chlorotetracycline. |
| 4—N($CH_3$)$_2$,6—OH,12a—OH | 6-demethyltetracycline. |
| 12a—OH | 6-deoxy-6-demethyl-4-desdimethyl-aminotetracycline. |

In addition to compounds such as these, tetracycline-like compounds possessing a 2-cyano group in place of the carboxamido group are known, and it is well recognized that such substances exhibit markedly lower antimicrobial activity than the corresponding 2-carboxamido analogs.

A process has now been discovered for the preparation of acid-stable tetracyclines from their 2-decarboxamido-2-nitriles. In accordance with this novel and remarkably simple procedure, it is merely necessary to form a fluid mixture of the nitrile with specified proportions of water and a fluoride selected from the group consisting of boron trifluoride complexes and hydrogen fluoride to cause the desired hydrolysis to occur.

It has been known in the past that certain simple nitriles may be hydrolyzed to amides, e.g. by treatment with 80% or concentrated sulfuric acid. However, subjection of tetracycline-2-nitriles to such agents under a wide variety of conditions fails to produce the desired conversion in any significant degree. Careful study of the residues obtained from these attempted reactions, utilizing such methods as infrared spectrophotometry and paper chromatography, establishes that if indeed any amide is present it occurs merely to the extent of a trace impurity. All attempts to produce recoverable quantities of the desired products by such methods have been unsuccessful.

In contrast to the failures resulting from such conventional procedures, the present new process readily effects substantially complete conversion of nitrile to amide, and provides reaction mixtures from which the desired product as easily recovered.

As previously noted, the agents which are effective are boron trifluoride complexes and hydrogen fluoride. The boron trifluoride complexes comprises a well defined, limited class of substances including boron fluoride etherate, $BF_3 \cdot O(C_2H_5)_2$, (B.P. ca. 120–5° C.), the diacetic acid complex, the dibutyl ether complex, the methanolate, as well as boron fluoride dihydrate and the like. All of the known boron trifluoride complexes are found suitable for the new process.

Of course, for present purposes the fluoride is employed in the liquid state. Although hydrogen fluoride boils at about 19° C. at atmospheric pressure, it is readily maintained in the liquid state, particularly in view of the fact that it is employed in the present process together with water, in which it is highly soluble. Reaction under pressure may be employed to prevent evaporation of fluoride, but this will usually be unnecessary.

Whichever of these fluorides is selected for use, at least one mole is to be employed per mole of the tetracycline nitrile. There is no disadvantage to the employment of higher proportions and, indeed, excellent results are obtained by employing substantial excesses in the role of diluent or reaction medium for the process of the present invention.

The second essential reaction component is water. A minimum of one mole of water per mole of the nitrile is required to effect the desired hydrolysis, but higher proportions are also successfully employed provided that excessive dilution is avoided. The reaction medium should contain at least about 2 moles of boron trifluoride or hydrogen fluoride per liter.

In addition to the foregoing essential components, the reaction medium may also optionally include a reaction-inert solvent for the nitrile, i.e. a solvent which is chemically inert with respect to the other components and the product. Particularly suitable for this purpose are the lower alkanols, e.g. methanol, and the lower alkanoic acids, e.g. acetic acid. Of course, the solvent proportion will be selected to conform to the above-specified minimum fluoride concentration. As previously noted, an added solvent is not essential, since the fluoride may fulfill the same role.

The tetracycline nitriles are solids, and it will be self-evident that the relative proportion of nitrile to liquid reaction medium should be such as will provide a fluid mixture, to facilitate mixing and in insure intimate contact between the reactants. Complete solution of the nitrile in the medium is advantageous, but partial solution as a uniform slurry or suspension will be adequate. This is ordinarily not a problem, since hydrogen fluoride and the various boron fluoride complexes such as the etherate are good solvents for the tetracycline nitriles, even in the absence of added inert solvent. While optimum proportions vary somewhat with the temperature and the particular reactants, it will usually be found convenient to employ about 3–5 ml. or more of liquid per gram of the nitrile.

Following the new procedure of this invention the nitrile is merely combined with an appropriate proportion of the fluoride and water, together with added solvent if desired, and the mixture is maintained at a temperature between about 0 and 100° C. until the hydrolysis is substantially complete. At temperatures materially below 0° C. the reaction is inconveniently slow, while temperatures substantially above 100° C. may cause degradation of the tetracycline. It is most convenient to employ a temperature below the atmospheric boiling point of the reaction mixture; otherwise, a pressure vessel will be required.

The progress of the reaction is easily followed by periodic withdrawal of samples. These may be combined with ether and the infrared absorption of the resulting precipitate determined in the 4.5µ region of the spectrum. When the characteristic nitrile band in this area has disappeared the reaction is complete. The time required for a given conversion will naturally vary with the temperature and particular reactants and proportions selected. Reaction times of from about one to twelve hours or more will usually be appropriate. At this time the product may be recovered from the reaction mixture by conventional means, such as precipitation with a non-solvent, e.g. ether, or evaporation to dryness. Further purification may be effected if desired by the usual procedures, such as recrystallization, e.g. as the hydrochloride or other acid addition salt.

The new process of the present invention is broadly useful for the preparation of any acid-stable 6-deoxytetracycline from its 2-decarboxamido-2-nitrile. Thus, tetracyclines having a 6-hydroxy group are not prepared by this procedure, being subject to degradation under the conditions employed.

Nitrile starting compounds may be prepared by the procedures described in the Journal of the American Chemical Society, vol. 75, p. 5468 (1953) and vol. 79, p. 2856 (1957) by treatment of a 6-deoxytetracycline with an alkyl or arylsulfonyl halide in the presence of organic base. In this fashion 2-decarboxamidotetracyclines such as the following are preparable:

6-deoxy-6-demethyltetracycline-2-nitrile
6-deoxytetracycline-2-nitrile
6-deoxy-7-chlortetracycline-2-nitrile
6-deoxy-6-demethyl-7-chlortetracycline-2-nitrile
6-deoxy-5-oxytetracycline-2-nitrile
4-desdemethylamino-6-deoxy-6-demethyltetracycline-2-nitrile Corresponding 12a-deoxy derivatives are afforded from these by reduction via the 12a-formates.

The aforementioned tetracycline nitriles are illustrative of the variety of compounds which are starting materials for the new process of the present invention. Of course, it will be obvious that nitrile substituents elsewhere in the molecule will also be subject to conversion to carboxamide under the conditions employed, and an appropriate adjustment in reactant proportions will be made in such instances.

As is known, the tetracyclines have a tendency to partial conversion to their 4-epimers in solution at acidic pH. Accordingly, the products of the novel process of the present invention sometimes contain a proportion of 4-epimer. It is usually desired to convert the latter to the corresponding diastereoisomer of normal configuration, i.e., to that form of the antibiotic having the stereochemical configuration of the product produced by fermentation or, in the case of synthetic tetracycline analogs, to that form which is analogous in stereochemical configuration to fermentation-produced tetracycline, etc. The desired conversion of 4-epimer may be achieved by the procedure more fully described in copending application, Serial No. 43,004, filed July 15, 1960, now U.S. Patent 3,009,956.

According to the procedure of that copending application, the tetracycline containing a proportion of 4-epimer is maintained in solution in the form of a metal chelate or salt until isomerization of the epimer to the normal configuration occurs. The tricalcium or trimagnesium tetracycline chelates are suitable forms for this spontaneous conversion, as are the dicalcium, dimagnesium and tristrontium derivatives. They are conveniently formed in a solution of the tetracycline by addition of an appropriate molar proportion of a salt of the selected cation with a reaction-compatible anion, e.g. the chloride. The metal chelate solution is then adjusted to pH 8.5–10 (as measured after dilution of a sample of the organic solution with an equal volume of water) and maintained at a temperature preferably between 50 and 115° C. until the desired transformation is substantially complete. As further disclosed in the copending application, all reaction-inert oxygenated solvents are suitable for this reaction, including liquid polyols and lower alkanols, particularly propylene glycol, butanol, or butanol plus about 5% water. The progress of the isomerization is convenienty followed by periodically withdrawing samples and assaying these by means of paper chromatography. This may be carried out, for example, on Whatman No. 4 paper saturated with pH 4.2 aqueous citrate-phosphate buffer as the stationary phase, employing 20:3 by volume toluene:pyridine saturated with water as the mobile phase. By the use of appropriate controls the location of the 4-epimer spot is accurately ascertained and the progress of its disappearance followed. In the solvent system described, 6-deoxy-6-demethyltetracycline has an Rf value of about 0.47 vs. 0.30 for its C-4 epimer. Upon completion of the isomerization the product is recovered by conventional procedures, e.g. by precipitation with a non-solvent such as water, and decomposition of the metal chelate by treatment in methanolic solution with HCl.

While the mechanism of the new process of the present invention has not yet been fully established, it is believed to proceed in the following manner:

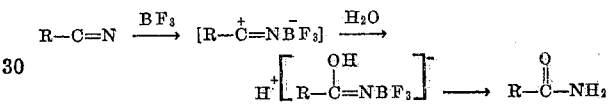

where R is a 2-decarboxamido-6-deoxytetracycline radical. Under anhydrous conditions, in the presence of an alkanol or a phenol, the course of the reduction may be modified, to yield an imino ether:

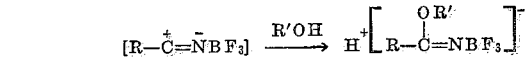

for example, by dissolving 1 g. of 2-decarboxamido-6-deoxy-6-demethyltetracycline-2-nitrile in 10 g. of p-cresol, and adding 10 ml. boron trifluoride etherate or bubbling in boron trifluoride for 10 minutes. The imino ether is recovered, after the reaction mixture has remained at room temperature for 24 hours, by pouring the mixture into ether and recovering the precipitated product. The resulting compound no longer exhibits an infrared absorption peak in the 4.5µ region, and in the above illustration is characterized by infrared absorption peaks at 6.2, 6.65, 6.9, 7.73, 8.09, 8.25, 8.43, 8.61, 8.90, 9.2, 9.5 and 9.68µ, and ultraviolet absorption in HCl at 270 and 345 mµ. The thus-produced imino ethers are appropriate for further reaction sequences, e.g. with alcohols or with ammonia to provide, respectively, the corresponding 2-carboxylate and 2-amidine derivatives of the tetracycline compound. For these reactions it will be appreciated that moisture must be excluded. The imino ether, upon reflux in methanol containing a low concentration of aqueous HCl, is converted to the 2-carboxamide.

6-Deoxytetracyclines may be prepared by catalytic hydrogenation of corresponding tetracyclines as described in the Journal of the American Chemical Society, vol. 80, p. 5324 (1958). Other 6-deoxytetracyclines may in turn be prepared by subjecting these to aromatic substitution reactions as described in the same journal, vol. 82, p. 1003 (1960).

The following examples are provided for illustrative purposes and should not be interpreted as limiting the invention, the scope of which is defined by the appended claims.

EXAMPLE I

*6-Deoxy-6-Demethyltetracycline-10-Benzenesulfonate*

2-decarboxamido-6-deoxy - 6 - demethyltetracycline-2-nitrile-10-benzenesulfonate, 500 mg., containing an equimolar proportion of water, is dissolved in 7 ml.

boron trifluoride diacetic acid complex and stirred at room temperature for seven days. The solution is then poured into 100 ml. ether and the resulting precipitate is filtered and dried to obtain 680 mg. crude product. The latter is suspended in 20 ml. methanol, heated to boiling, and filtered hot to separate a minor quantity of undissolved, unreacted nitrile. The resulting filtrate is treated with 1 ml. concentrated hydrochloric acid and heated at reflux temperature for 20 minutes, whereupon the desired product crystallizes in the form of the hydrochloride. Filtration and drying provide 320 mg. of product which, after recrystallization from boiling methanol, is assayed and found to contain 4.67% nitrogen and 5.42% sulfur. The infrared spectrum exhibits no absorption maxima in the $4.5\mu$ region which is assignable to the nitrile function.

The product is converted to 6-deoxy-6-demethyltetracycline by dissolving 300 mg. in 4.5 ml. concentrated sulfuric acid, stirring at room temperature for one hour, and pouring the solution into 115 ml. ether. The resulting precipitate is filtered and dried. Paper chromatography, on Whatman No. 4 paper employing pH 4.2 aqueous citrate-phosphate buffer as the stationary phase and 20.3 by volume toluene:pyridine saturated with water as the mobile phase, shows that the precipitate is an approximately equal mixture of 6-deoxy-6-demethyltetracycline and its 4-epimer.

The 4-epimer content of the mixture is isomerized by the procedure of application Serial No. 43,004, as follows: 207 mg. of the precipitate is dissolved in 1.5 ml. butanol containing 5 volume percent water and treated with 170 mg. anhydrous calcium chloride. The resulting solution is adjusted to pH 8.5 with monoethanolamine and heated at reflux until paper chromatography shows a negligible 4-epimer content. The solution is then filtered hot and the filtrate is treated with 0.5 ml. conc. hydrochloric acid. The 6-deoxy-6-demethyltetracycline crystallizes as the hydrochloride and is recovered by filtration.

One source of the starting compound for this example is the following procedure:

Benzenesulfonyl chloride, 3.6 g., is added to a solution of 2.2 g. of 6-deoxy-6-demethyltetracycline hydrochloride in 7 ml. pyridine at 5° C. The mixture is held at that temperature for 16 hours and the solution is then poured into 50 ml. ether. The resulting precipitate is separated and purified by stirring one hour with 25 ml. water, filtering, recrystallizing twice from dimethyl formamide, and again stirring with water. The recrystallized 2-decarboxamido-6-deoxy-6-demethyltetracycline - 2 - nitrile-10-benzenesulfonate exhibits characteristic nitrile infrared absorption at $4.5\mu$.

EXAMPLE II

*6-Deoxy-6-Demethyltetracycline*

A mixture of 2 g. 2-decarboxamido-6-deoxy-6-demethyltetracycline-2-nitrile - 10 - benzenesulfonate and 1 ml. water in 25 ml. boron trifluoride etherate is stirred at 100° C. for 12 hours. The solution is then poured into 350 ml. ether, and 2.4 g. of precipitated product are recovered by filtration and drying.

The product is further purified by solution in methanol and treatment with an excess of p-toluenesulfonic acid. After 16 hours 1.3 g. of crystallized p-toluenesulfonic acid salt is recovered by filtration and drying. This product exhibits an activity of 500 mcg./mg. (*K. pneumoniae* assay vs. oxytetracycline standard). Paper chromatography shows that the product consists of the salts of 6-deoxy-6-demethyltetracycline and its 4-epimer. Isomerization of the epimer content is carried out as in Example I.

EXAMPLE III

*6-Deoxy-6-Demethyltetracycline*

This product is prepared by treating 2-decarboxamido-6-deoxy-6-demethyltetracycline-2-nitrile with boron trifluoride etherate and water as described in the preceding example. The starting compound is prepared as follows:

A solution of 500 mg. 2-decarboxamido-6-deoxy-6-demethyltetracycline-2-nitrile-10-benzenesulfonate in 8 ml. anhydrous liquid hydrogen fluoride is stirred for 16 hours in a stoppered polyethylene container. The hydrogen fluoride is removed in a stream of nitrogen and the residue slurried in ether, filtered and dried to obtain 717 mg. of crude 2-decarboxamido - 6 - deoxy - 6 - demethyltetracycline-2-nitrile. The latter is further purified by suspneding in 15 ml. methanol, adding sufficient triethylamine to form a solution, and neutralizing with concentrated hydrochloric acid. The 2-nitrile thereupon crystallizes in the form of a monomethanolate and 400 mg. are recovered by filtration and drying. This substance exhibits infrared absorption maxima in potassium bromide at 4.56, 6.38, 6.88, 7.50, 7.75, 8.07, 8.60, 8.95 and $9.55\mu$. Ultraviolet absorption maxima are observed at 222, 278 and 354 m$\mu$ in 0.01 N methanolic HCl. Assay shows 62.10% carbon, 5.41% hydrogen, 6.43% nitrogen, and 7.03% methoxy.

EXAMPLE IV

*6-Demethyl-6,12a-Dideoxytetracycline*

This product is prepared by treating 2-decarboxamido-6-demethyl-6,12a-dideoxytetracycline-2-nitrile with boron trifluoride etherate and water as described in Example II. The starting compound is obtained as follows:

2-decarboxamido-6-deoxy - 6 - demethyltetracycline-2-nitrile (Example III), 10 g., is dissolved in 200 ml. dry pyridine and the solution is cooled to 0° under nitrogen. Acetoformic anhydride, 20 ml., is added dropwise with stirring over a 20-minute period while maintaining the temperature below 4° C. Stirring is continued for an additional 30 minutes and the mixture is then poured into dry ether under nitrogen. The ether mixture is stirred until the resulting precipitate is in the form of a finely divided yellow solid. The latter is then recovered by filtration under nitrogen, washed free of pyridine and salt with ether, and dried under nitrogen.

The thus-produced 10.7 g. of 2-decarboxamido-6-deoxy-6-demethyltetracycline-2-nitrile - 12a - formate is dissolved in 250 ml. dry dimethylformamide and the solution is subjected to 1000 p.s.i. hydrogen pressure at 60° C. for 8 hours in the presence of 2 g. 10% palladium on carbon. The reaction mixture, which exhibits intense green fluorescence, is concentrated under reduced pressure, poured into water, and the resulting precipitate recovered by filtration. Recrystallization from aqueous dimethylformamide yields 8.2 g. of 2-decarboxamido-6-demethyl-6,12a-dideoxytetracycline-2-nitrile hydrate in the form of red prisms. An infrared absorption maximum characteristic of nitrile function is observed at $4.5\mu$. Strong UV absorption characteristic of 12a-deoxytetracyclines is exhibited at 415, 436 and 458 m$\mu$ in 0.01 N HCl, and at 431, 459 and 482 m$\mu$ in 0.01 N NaOH.

EXAMPLE V

*6,12a-Dideoxy-6-Demethyl Tetracycline*

2 - decarboxamido - 6,12a - dideoxy - 6 - demethyltetracycline-2-nitrile, 4 g., is combined with 50 ml. hydrogen fluoride and 0.5 ml. water in a polyethylene container and stirred at ice bath temperature. Aliquots are withdrawn periodically, evaporated to dryness, and the infrared absorption of the residue is determined in the $4.5\mu$ region. When disappearance of the characteristic nitrile absorption band is observed, the reaction mixture is evaporated to dryness, and the crude hydrofluoride is dissolved in water and treated with conc. hydrochloric acid to precipitate the product as a hydrochloride salt.

Following the same procedure, the following tetracyclines are prepared from their 2-decarboxamido-2-nitriles:

6-deoxy-6-demethyltetracycline
6,12a-dideoxytetracycline
6-deoxytetracycline
6-deoxy-7-chlortetracycline
6,12a-dideoxy-7-chlortetracycline
6-deoxy-6-demethyl-7-chlortetracycline
6,12a-dideoxy-6-demethyl-7-chlortetracycline
6-deoxy-5-oxytetracycline
6,12a-dideoxy-5-oxytetracycline
4-desdimethylamino-6-deoxy-6-demethyltetracycline Where significant concentrations of 4-epimers occur in the products, these are isomerized by the procedure described in Example I.

What is claimed is:

1. The process for the preparation of an acid-stable 6-deoxytetracycline from its 2-decarboxamido-2-nitrile which comprises forming a fluid mixture of said nitrile with a liquid reaction medium comprising at least one mole each of water and of a fluoride per mole of said nitrile and having a fluoride concentration of at least about two moles per liter, said fluoride being selected from the group consisting of boron trifluoride complexes and hydrogen fluoride, and maintaining said mixture at a temperature between about 0 and 100° C. until the conversion is substantially complete.

2. A process as claimed in claim 1 wherein said reaction medium includes a reaction-inert solvent for said nitrile.

3. A process as claimed in claim 1 wherein said fluoride is boron trifluoride etherate.

4. A process as claimed in claim 1 wherein said fluoride is boron trifluoride diacetic acid complex.

5. A process as claimed in claim 1 wherein said fluoride is hydrogen fluoride.

No references cited.